(12) United States Patent
Huber et al.

(10) Patent No.: US 7,278,625 B2
(45) Date of Patent: Oct. 9, 2007

(54) METERING VALVE

(75) Inventors: Sven Huber, Ainring (DE); Hanspeter Mayer, Markt Piesting (AT); Alexander Moell, deceased, late of Tuttlingen (DE); by Brigitte Moell, legal representative, Gottmadingen (DE); by Helmut Moell, legal representative, Gottmadingen (DE); Gerhard Mueller, Freilassing (DE); Michael Offenhuber, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 10/181,623

(22) PCT Filed: Nov. 21, 2001
(Under 37 CFR 1.47)

(86) PCT No.: PCT/DE01/04406

§ 371 (c)(1),
(2), (4) Date: Mar. 29, 2004

(87) PCT Pub. No.: WO02/42616

PCT Pub. Date: May 30, 2002

(65) Prior Publication Data

US 2004/0262333 A1 Dec. 30, 2004

(30) Foreign Application Priority Data

Nov. 23, 2000 (DE) .................................. 100 58 015

(51) Int. Cl.
*F16K 1/48* (2006.01)

(52) U.S. Cl. ......................................... 251/356; 138/27
(58) Field of Classification Search ................ 137/301; 138/27–28, 32; 251/356
See application file for complete search history.

(56) References Cited

U.S. PATENT DOCUMENTS

| 651,617 A | * | 6/1900 | Tilden ........................ 138/28 |
| 660,382 A | * | 10/1900 | Lambert ...................... 138/27 |
| 4,784,173 A | * | 11/1988 | Carney ........................ 137/2 |
| 6,062,531 A | * | 5/2000 | Rapp et al. .................. 251/50 |
| 6,311,948 B1 | * | 11/2001 | Weaver ....................... 251/54 |

FOREIGN PATENT DOCUMENTS

| DE | 38 03 374 A1 | 2/1988 |
| GB | 371860 | 1/1931 |
| JP | 56-164287 | 12/1981 |
| JP | 6-17955 | 1/1994 |
| JP | 20000-27627 | 1/2000 |
| JP | 20000-74243 | 3/2000 |
| WO | WO 00/21881 | 4/2000 |

* cited by examiner

*Primary Examiner*—Gregory Huson
*Assistant Examiner*—Cloud Lee
(74) *Attorney, Agent, or Firm*—Ronald E. Greigg

(57) ABSTRACT

A valve device for metering a fluid for metering a urea-water solution for the aftertreatment of exhaust gases from internal combustion engines, which contains elements that flex or are compressed under high pressure so that the volume of the working chamber can change in order to limit high pressures, which arise in the event of a phase change of the fluid to be metered, to a non-damaging intensity.

13 Claims, 2 Drawing Sheets

METERING VALVE

CROSS-REFERENCE TO RELATED APPLICATIONS

This application is a 35 U.S.C. 371 application of PCT/DE 01/04406, filed on Nov. 21, 2001.

BACKGROUND OF THE INVENTION

1. Field of the Invention

The invention is directed to an improved metering valve device for metering treatment solution for aftertreatment of exhaust gases.

2. Description of the Prior Art

German patent application serial number 1 00 40 571.1 has disclosed a metering valve for metering a reducing agent, in which the reducing agent, which is in liquid form, is conveyed through a working chamber of the valve, which has a fixed predetermined volume.

SUMMARY OF THE INVENTION

The valve device according to the invention has the advantage over the prior art that particularly for vehicular applications, a proper metering of fluids can be executed without the device being damaged by a possible freezing of the fluid. When the fluid thaws again, the valve device is once again fully functional and can endure such a freezing cycle repeatedly. The valve seat, seals, and molded masses that are possibly present for a magnet coil of the valve are not damaged and fluid-carrying lines are not deformed. Particularly with the use of aqueous solutions, the design according to the invention turns out to be a component that is able to withstand freezing pressure and can be produced by simply retrofitting conventional valves, e.g. gasoline injection valves used in motor vehicles or gas metering valves. The device according to the invention is particularly advantageous for use in urea metering systems for the aftertreatment of exhaust gases of internal combustion engines. Through the use of elements that flex under pressure, the buildup of high compressive forces can be prevented and even components and materials that have a low capacity for withstanding pressure can be used.

It is particularly advantageous to provide a gas-filled diaphragm unit, an elastic molded tube part, or an elastically compressible tube, by means of which existing nozzle designs can be simply altered independent of whether they involve valve designs that are flowed through over their entire length or devices with a lateral fluid inlet.

Furthermore, a mobile support of the valve advantageously permits a compensation movement of the valve to protect a fluid-carrying line that connects to the outlet of the valve.

BRIEF DESCRIPTION OF THE DRAWINGS

Exemplary embodiments of the invention are shown in the drawings and will be explained in detail in the subsequent description. In the drawings.

DESCRIPTION OF THE PREFERRED EMBODIMENTS

Figure 1:
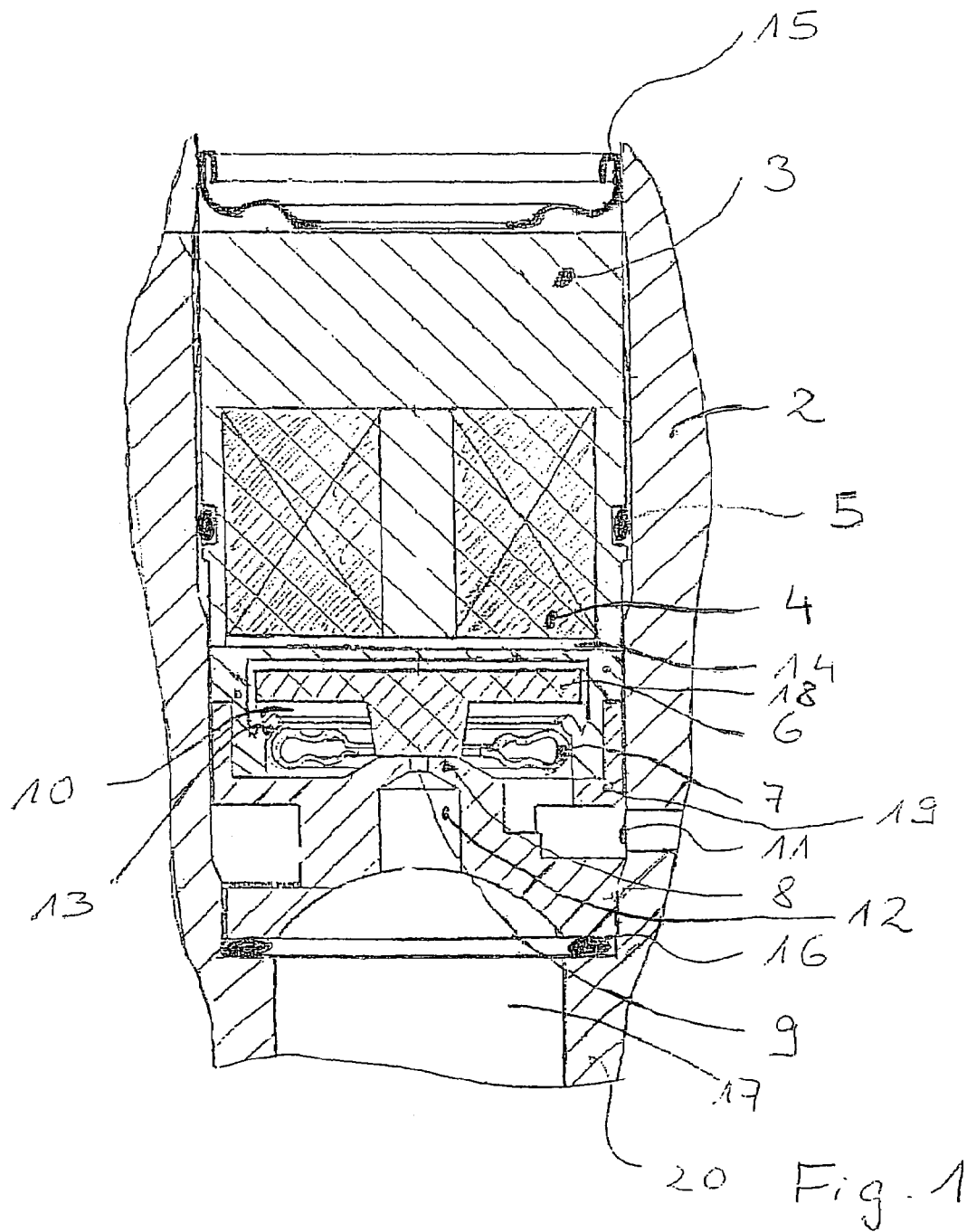
FIG. 1 shows a valve device embodying the invention with a lateral fluid inlet.

FIG. 1 shows a valve device with a valve body (3,18,19), which includes a coil part 3 with a magnet coil 4, a working chamber part 18 that encompasses a working chamber 10, and an inlet/outlet region 19. The valve body is accommodated in an opening of the solenoid valve holder 2 and is locked in place by means of an elastic clamping washer 15. The valve body here rests against the walls 20 of the line 17 by means of the elastomer sealing ring 16. A lateral inlet 11 into the working chamber of the valve body is integrated into the solenoid valve holder 2. The seal in relation to the line 17 is produced by means of the elastomer sealing ring 16; the seal in relation to the outer chamber of the solenoid valve holder is assured by means of an 0-ring seal 5, which encompasses the circumference of the coil part 3 in a sealing fashion, approximately at the level of the magnet coil 4. The inlet 11 leads into the working chamber 10, in which a valve plate 6 is movably supported. The valve plate can be lifted up from the outlet opening 9 through the application of a current to the magnet coil 4 and thus can open up the path to the outlet region 12 and the line 17 for a fluid contained in the working chamber 10. The outlet opening 9 is embodied in the valve seat 8 in the form of a bore, which transitions into the outlet region 12 that has a greater diameter than the diameter of the bore. The working chamber contains a gas-filled diaphragm unit 7, which is situated in a rotationally symmetrical fashion around the valve seat and the part of the valve plate that covers the outlet opening 9. The diaphragm unit here is locked in place by means of a caulking 13 of the working chamber part 18 of the valve body. A seal 14 disposed between the coil part 3 of the valve body and the working chamber part 18 produces a fluid-tight seal between the magnet coil 4 and the rest of the valve device.

The above-described valve device is particularly suited for the metering of aqueous solutions, which run the risk of freezing in the lines and in the metering valve at low operating temperatures. In the event that this aqueous solution, for example a urea-water solution, freezes in the inlet or in the working chamber, the gas-filled diaphragm unit is compressed until there is a sufficient volume for the aqueous solution or its solid phase. The diaphragm unit is designed so that the fluid pressures, which fluctuate around the order of magnitude of the few bar, for example 3 bar, do not cause the diaphragm unit to be deformed. Only in the event of a freezing of the aqueous solution are considerably higher pressures produced, for example on the order of magnitude of 1000 bar, which compress the diaphragm unit so that an increased working chamber volume is available for the frozen aqueous solution. When the fluid thaws, the deformation of the diaphragm unit decreases in accordance with the decreasing pressure until it reverts to the initial state and the diaphragm unit is ready to function as an overpressure prevention mechanism in the event of a renewed freeze. A compensation mechanism is also provided for in the event that the aqueous solution freezes in the outlet region 12 or in the line 17. The freezing pressure produced by the volume expansion of the ice being produced presses the valve body against the elastic clamping washer 15, which flexes slightly and permits the valve body to move axially in the direction of the clamping washer. This increases the volume available for the fluid in the outlet region 12. The spring force of the clamping washer is dimensioned just so that on the one hand, the sliding of the valve body assures a sufficient pressure decrease so that the freezing pressure can cause no damage to the lines and to the valve device and so that on the other hand, the valve body also rests against the line 17 in a tightly closed manner, secured by means of the elastomer sealing ring 16. If the fluid thaws, in the same way as the diaphragm unit, the clamping washer 15 also relaxes again so that the same compensation mechanism remains available in the event that the aqueous solution freezes again. Both the elastic diaphragm unit and the clamping washer 15 thus limit the freezing pressure to a non-damaging intensity, i.e. the deformations are reversible and are limited to the elements specifically provided for this purpose, i.e. are limited to the clamping disk 15 and the diaphragm unit 7.

Figure 2:
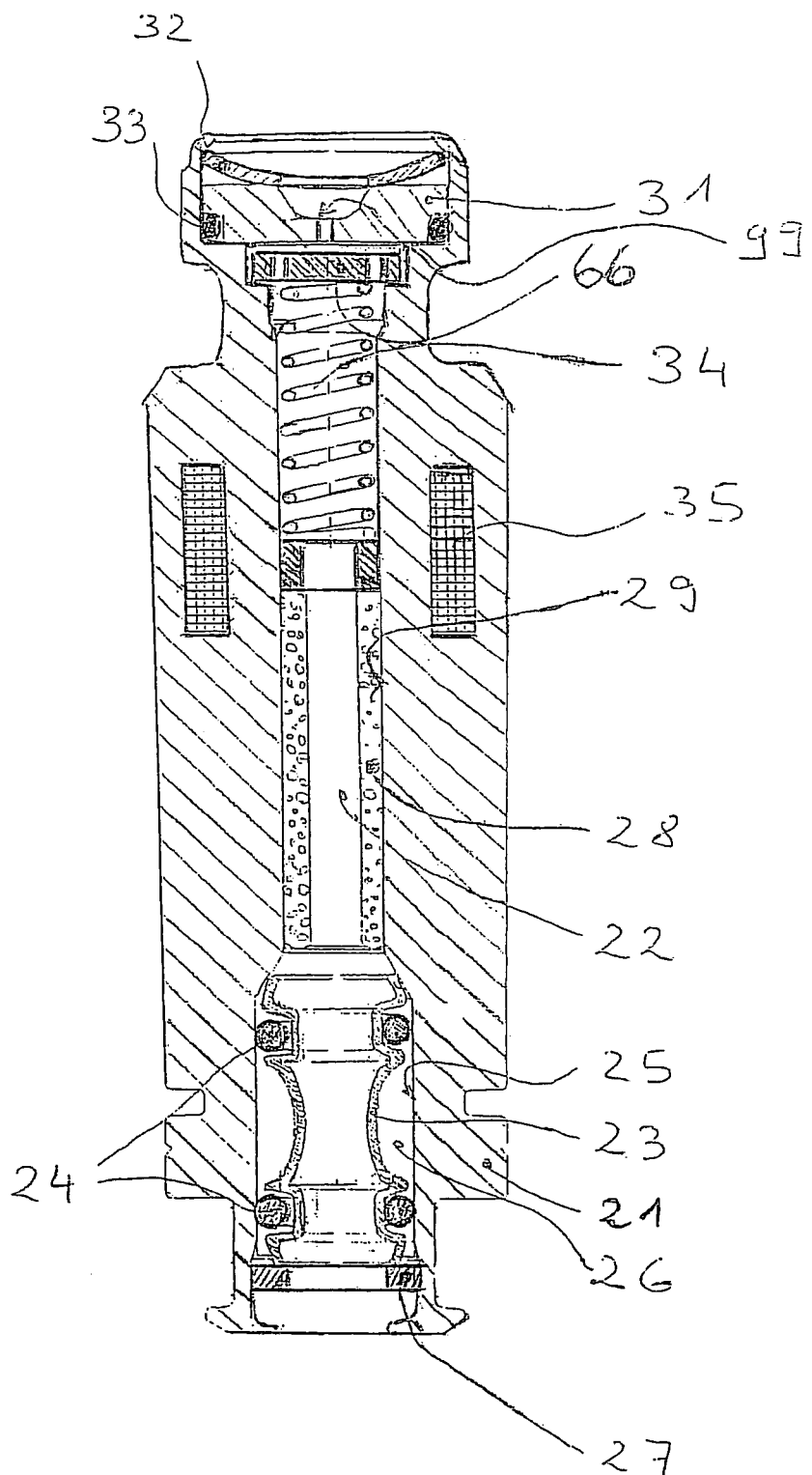
FIG. 2 shows a valve device with an axial through flow.

FIG. 2 shows a solenoid valve, through which a flow passes over its entire length via a central bore 22 with a multiply stepped diameter. A magnet coil 35 is integrated into the housing 21 of the solenoid valve and can be used to exert a force on the valve plate 66 directed counter to the compressive force of the spring 34 in order to unblock the nozzle opening 99 integrated into the elastically supported nozzle plate 31 for a fluid contained in the bore 22. The nozzle plate 31 is fixed by means of a spring plate 32 that is clamped between the housing 21 and the nozzle plate 31. An O-ring seal 33 seals the nozzle plate in relation to the housing. A part of the bore 22 is lined with an elastically compressible tube 28. This tube is comprised of cellular rubber or closed-cell foam thermoplastic, which is installed in a pre-compressed state and after its expansion, rests snugly against a wall 29 of the bore 22. In addition, a longitudinally and laterally elastic molded tube part 23 is integrated into the bore 22, providing an air-filled compensation volume 26 between the molded tube part and housing wall 25. A press-filled disk 27 locks the molded tube part in place axially and O-ring seals 24 assure that no fluid can penetrate into the compensation volume 26.

If an aqueous solution freezes in the bore 22 of the solenoid valve, then there are three different mechanisms for producing a compensation volume. The elastic molded tube part 23 can use the compensation volume 26 to provide an increased volume for the fluid in the event that a freezing pressure builds up in the bore. The compressible tube 28 also contributes to the compensation of a volume increase due to a freeze. Like the molded tube part and the compressible tube, the spring plate 32 is also designed so that it flexes perceptibly only under freezing pressures in order, by means of a resulting sliding of the nozzle plate 31, to prevent damage to the solenoid valve. Under normal operating pressures, which fluctuate around the order of magnitude of the few bar, the molded tube part, the tube 28, and the nozzle plate 31 remain essentially in the initial state. Here, too, the elements are designed so that deformations of the above-mentioned elements due to freezing pressure disappear again completely as soon as the fluid thaws.

The foregoing relates to preferred exemplary embodiments of the invention, it being understood that other variants and embodiments thereof are possible within the spirit and scope of the invention, the latter being defined by the appended claims.

We claim:

1. A valve device for metering a fluid for the after treatment of exhaust gases from internal combustion engines, comprising
a valve body (3, 18, 19; 21) having a working chamber (10; 22), and an outlet opening (9; 99), a valve plate (6; 66) movably supported in the working chamber in order to open and close the outlet opening (9; 99) of the working chamber, and a flexible wall (23, 28, 31) that flexes under pressure and/or contains at least one compressible element (7) at least partially bounding the working chamber so that the volume of the working chamber can change in the event that the fluid contained therein undergoes a phase change, further comprising a valve holder (2) movably supporting the valve body and connecting it to a line (17) in such a way that the valve body can execute a compensation movement to enlarge the line volume if the fluid contained in the line freezes, and further comprising a spring element fastened to the valve holder (2) for moving the valve body back toward the line as soon as the frozen fluid in the line melts.

2. The valve device according to claim 1 wherein the compressible element is in particular a gas-filled diaphragm unit.

3. The valve device according to claim 1 wherein the spring element is an elastic clamping washing (15).

4. The valve device according to claim 3 further comprising a sealing ring (16), disposed between the line and the valve body so that the valve body rests against the line in a fluid-tight manner, both above the freezing temperature of the fluid and in the event of a compensation movement.

5. The valve device according to claim 3 further comprising an elastomer sealing ring (16), disposed between the line and the valve body so that the valve body rests against the line in a fluid-tight manner, both above the freezing temperature of the fluid and in the event of a compensation movement.

6. The valve device according to claim 1 further comprising a sealing ring, in particular an elastomer sealing ring (16), disposed between the line and the valve body so that the valve body rests against the line in a fluid-tight manner, both above the freezing temperature of the fluid and in the event of a compensation movement.

7. The valve device according to claim 6 further comprising a sealing ring, in particular an elastomer sealing ring (16), disposed between the line and the valve body so that the valve body rests against the line in a fluid-tight manner, both above the freezing temperature of the fluid and in the event of a compensation movement.

8. The valve device according to claim 1 further comprising a sealing ring, in particular an elastomer sealing ring (16), disposed between the line and the valve body so that the valve body rests against the line in a fluid-tight manner, both above the freezing temperature of the fluid and in the event of a compensation movement.

9. The valve device according to claim 1 wherein the valve body is inserted into an opening of the valve holder and is locked in place by the spring element (15) at the end of the valve body (3, 18, 19) opposite from the outlet opening (9) so that the compensation movement can occur in the axial direction.

10. The valve device according to claim 9 wherein a lateral inlet (11) to the working chamber is integrated into the valve holder (2).

11. The valve device according to claim 1, wherein the valve device meters a urea-water solution for the after treatment of exhaust gases from an internal combustion engine.

12. The valve device according to claim 1 further comprising an elastomer sealing ring (16), disposed between the line and the valve body so that the valve body rests against the line in a fluid-tight manner, both above the freezing temperature of the fluid and in the event of a compensation movement.

13. A valve device for metering a fluid for the after-treatment of exhaust gases from internal combustion engines, comprising a valve body (3, 18, 19; 21) having a working chamber (10; 22), and an outlet opening (9; 99), a valve plate (6; 66) movably supported in the working chamber in order to open and close the outlet opening (9; 99) of the working chamber, a valve holder (2) movably supporting the valve body and connecting it to a line (17) in such a way that the valve body can execute a compensation movement to enlarge the line volume if the fluid contained in the line freezes, and a sealing ring is disposed between the line and the valve body so that the valve body rests against the line in a fluid-tight manner, both above the freezing temperature of the fluid and in the event of a compensation movement, and further comprising a spring element fastened to the valve holder (2) for moving the valve body back toward the line as soon as the frozen fluid in the line melts.

* * * * *